United States Patent
Hong et al.

(10) Patent No.: US 8,223,719 B2
(45) Date of Patent: Jul. 17, 2012

(54) APPARATUS FOR CONTROLLING HANDOVER BETWEEN HETEROGENEOUS NETWORKS, METHOD OF PERFORMING HANDOVER BETWEEN HETEROGENEOUS NETWORKS, AND MOBILE ROUTER

(75) Inventors: Hyun-ha Hong, Seoul (KR); Ki-seop Han, Seoul (KR); Dae-ig Chang, Daejeon-si (KR); Ho-jin Lee, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 362 days.

(21) Appl. No.: 12/553,622

(22) Filed: Sep. 3, 2009

(65) Prior Publication Data
US 2010/0074221 A1 Mar. 25, 2010

(30) Foreign Application Priority Data
Sep. 23, 2008 (KR) .................. 10-2008-0093359

(51) Int. Cl.
*H04W 4/00* (2009.01)
*H04W 36/00* (2009.01)
*H04W 24/00* (2009.01)
*H04L 12/56* (2006.01)

(52) U.S. Cl. ........ 370/331; 370/338; 370/401; 455/440; 455/456.3

(58) Field of Classification Search .................. 370/260, 370/328–329, 331–332, 338, 349, 390, 393, 370/401; 455/431–444, 450–456.6
See application file for complete search history.

(56) References Cited

U.S. PATENT DOCUMENTS

| | | | |
|---|---|---|---|
| 6,584,316 B1 * | 6/2003 | Akhteruzzaman et al. ... | 455/445 |
| 6,885,869 B2 * | 4/2005 | Raith ......................... | 455/456.6 |
| 7,577,448 B2 * | 8/2009 | Pande et al. ................ | 455/456.6 |
| 2003/0003922 A1 * | 1/2003 | McClure ....................... | 455/456 |
| 2004/0082311 A1 * | 4/2004 | Shiu et al. ..................... | 455/403 |
| 2006/0193295 A1 * | 8/2006 | White et al. .................. | 370/336 |
| 2006/0268784 A1 | 11/2006 | Lee et al. | |
| 2007/0025293 A1 * | 2/2007 | Choi ............................. | 370/331 |
| 2007/0275726 A1 | 11/2007 | Lee et al. | |
| 2009/0168701 A1 * | 7/2009 | White et al. .................. | 370/328 |
| 2009/0233602 A1 * | 9/2009 | Hughes ......................... | 455/436 |
| 2010/0046477 A1 * | 2/2010 | Marin et al. .................. | 370/332 |

FOREIGN PATENT DOCUMENTS

| | | |
|---|---|---|
| KR | 1020060121634 | 11/2006 |
| KR | 1020070017066 | 2/2007 |
| KR | 1020070061275 | 6/2007 |
| KR | 1020070065971 | 6/2007 |
| KR | 1020070113964 | 11/2007 |
| KR | 100895688 | 4/2009 |

* cited by examiner

*Primary Examiner* — Tri H Phan
(74) *Attorney, Agent, or Firm* — Nelson Mullins Riley & Scarborough LLP; EuiHoon Lee, Esq.

(57) ABSTRACT

Provided are an apparatus for controlling handover between heterogeneous networks, a method of performing handover between heterogeneous networks in a mobile router, and a mobile router. The method includes determining whether a handover to a network employing a different method from a network to which the mobile router belongs is required based on information prestored in the mobile router, the network to which the mobile router belongs determined by current location information of the mobile router and performing the handover according to the result of the determination. Mobility detection time can be reduced by applying the handover technique between wireless/satellite networks based on link trigger and location to a mobile router moving at high speed. Thus, service interruption can be prevented regardless of movement speed, even in a satellite shadow region such as a station.

16 Claims, 9 Drawing Sheets

FIG.11

| Movement Section | Satellite Network Trigger | Wireless Network Trigger | Trigger Location | Handover Reference Coordinates |
|---|---|---|---|---|
| Origin_Station | | Link up | (a,b) | |
| Origin_Exit | Link up | | (x1,y1) | |
| Origin_Exit | | Link down | (x2,y2) | |
| Station1_Entrance | | Link up | (x3,y3) | |
| Station1_Entrance | Link down | | (x4,y4) | (x4,y4) |
| Station1_Exit | Link up | | (x5,y5) | |
| Station1_Exit | | Link down | (x6,y6) | |
| Station2_Entrance | | Link up | (x7,y7) | |
| Station2_Entrance | Link down | | (x8,y8) | (x8,y8) |
| Station2_Exit | Link up | | (x9,y9) | |
| Station2_Exit | | Link down | (x10,y10) | |
| Destination_Entrance | | Link up | (x11,y11) | |
| Destination_Entrance | Link down | | (x12,y12) | (x12,y12) |
| Destination_Station | | Link up | (c,d) | |

APPARATUS FOR CONTROLLING HANDOVER BETWEEN HETEROGENEOUS NETWORKS, METHOD OF PERFORMING HANDOVER BETWEEN HETEROGENEOUS NETWORKS, AND MOBILE ROUTER

CROSS-REFERENCE TO RELATED APPLICATION

This application claims the benefit under 35 U.S.C. 119(a) of Korean Patent Application No. 10-2008-93359, filed on Sep. 23, 2008, the disclosure of which is incorporated by reference in its entirety for all purposes.

BACKGROUND

1. Field

The following description relates to inter-network handover, and more particularly, to an apparatus for controlling handover between heterogeneous networks, a method of performing handover between heterogeneous networks in a mobile router, and a mobile router.

2. Description of the Related Art

A mobile network in a vehicle such as a high-speed train having a mobile router and a fixed node uses mobile network technology based on Internet protocol version 4 (IPv4). When handover occurs between domains in the mobile network, packets transmitted from a correspondent node during visited network movement detection, agent detection, and a registration process are lost. Thus, a high-speed handover procedure is required.

For this reason, a technique of applying fast mobile IPv6 to mobile nodes while a high-speed mobile router moving at speeds in excess of 300 km/h like a high-speed train is performing handover has been suggested. The mobile router moves from an access router before handover, receives prefix information corresponding to a new access router, and then transmits the information to a mobile node. The mobile router and the mobile node request the previous access router for fast IPv6 binding update.

The previous access router and the new access router exchange handover initiate and notification messages according to fast IPv6 binding, and the previous access router transmits a fast binding acknowledgement message to the mobile node. Then, data sent to the mobile router and the mobile node using a previous prefix is transmitted from the previous access router via the new access router through a tunnel. When the mobile router receives the fast binding acknowledgement message, it immediately transmits a zero lifetime message for releasing the previous prefix to the mobile node, and then the mobile node transmits the data using the new prefix.

Fast mobile IPv6 used for handover as described above prevents packet loss during communication between a mobile node and a correspondent node while a mobile router is performing handover, and also reduces handover delay. However, a vehicle such as a high-speed train has small mobile cells, and thus probability of handover failure increases when the vehicle passes through several cells at high speed. Also, minimum time required for handover between cells is not ensured, and thus packets are lost.

Meanwhile, there is another technique for applying handover between satellite and wireless networks to a high-speed mobile router using a link trigger signal of multiple interfaces. According to this technique, a mobile router having multiple interfaces controls handover between mobile networks using sequential link up/down trigger signals. This technique prevents packet loss and session interruption regardless of movement speed of the mobile router, and when handover is performed between a terrestrial wireless home network and a visited satellite network, reduces power consumption by placing an inactivated network access interface in a sleep state. However, when the high-speed train that is providing service in a visible region of the satellite network enters a shadow region of the satellite network, handover to an interoperable wireless network should be immediately performed to continue the service. In this case, the mobile router passes through cells of the wireless network at high speed, and thus it is difficult to detect mobility using a link trigger signal. In other words, handover to the corresponding wireless network may fail, or time taken to perform handover may increase.

SUMMARY

The following description relates to a handover method and handover control apparatus capable of reducing network mobility detection time and providing Internet service in which a session connected to a fixed node is not interrupted.

Also, the following description relates to a handover method and handover control apparatus that automatically generate and manage satellite/wireless network area information, which becomes a reference for handover control determination at an administrator's request, according to a change in the wireless environment of satellite and terrestrial networks, and thus can actively adapt to the change in network environment.

According to an exemplary aspect, there is provided a method of performing handover between heterogeneous networks in a mobile router managing a mobile network, including: determining whether a handover to a network employing a different method from a network to which the mobile router belongs is required based on information prestored in the mobile router, the network to which the mobile router belongs determined by current location information of the mobile router; and performing the handover according to the result of the determination.

The method may further include obtaining information about the network to which the handover will be performed from link trigger signal information corresponding to the current location information of the mobile router, based on the prestored information.

The method may further include, before the determining of whether the handover is required: monitoring link trigger signal information when the mobile router moves; determining whether the handover to the network employing the different method is required based on the link trigger signal information; performing the handover according to the result of the determination; and matching information about a location at which the handover is performed with the link trigger signal information and storing the result of the matching.

According to another exemplary aspect, there is provided an apparatus for controlling handover between heterogeneous networks, including: a location information recognizer recognizing current location information of a mobile router managing a mobile network; a handover initiation information storage storing handover location information; a handover determiner determining whether a handover to a network employing a different method from a network accessed by the mobile router is required according to the current location information of the mobile router recognized by the location information recognizer, based on information prestored in the handover initiation information storage; and a handover performer performing the handover according to the result of the determination.

The apparatus may further include an information collector matching link trigger signal information with the current location information of the mobile router when the handover determiner determines that the handover is required, and storing the result of the matching in the handover initiation information storage, wherein the information collector includes a link trigger information collector collecting the link trigger signal information; and a location information collector collecting the location information recognized by the location information recognizer.

When the apparatus moves, the information collector may match location information of the apparatus with up/down link information of link trigger signals for networks employing different methods at the current location of the apparatus, and store the results of the matching in the form of a table.

The handover determiner may recognize link trigger signal information according to the current location information of the apparatus, and recognizes information about the network to which the handover will be performed according to the link trigger signal information.

According to still another exemplary aspect, there is provided a mobile router comprising an apparatus for controlling handover between heterogeneous networks, wherein the apparatus includes: a location information recognizer recognizing current location information of the mobile router; a handover initiation information storage storing handover location information; a handover determiner determining whether a handover to a network employing a different method is required according to the current location information recognized by the location information recognizer, based on information stored in the handover initiation information storage; and a handover performer performing the handover according to the result of the determination.

The apparatus may further includes: an information collector matching link trigger signal information with the current location information of the mobile router when the handover determiner determines that the handover is required, and storing the result of the matching in the handover initiation information storage, wherein the information collector includes a link trigger information collector collecting the link trigger signal information and a location information collector collecting the location information recognized by the location information recognizer.

Additional aspects of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed.

BRIEF DESCRIPTION OF THE DRAWINGS

FIG. 11 shows a handover initiation table according to an exemplary embodiment.

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
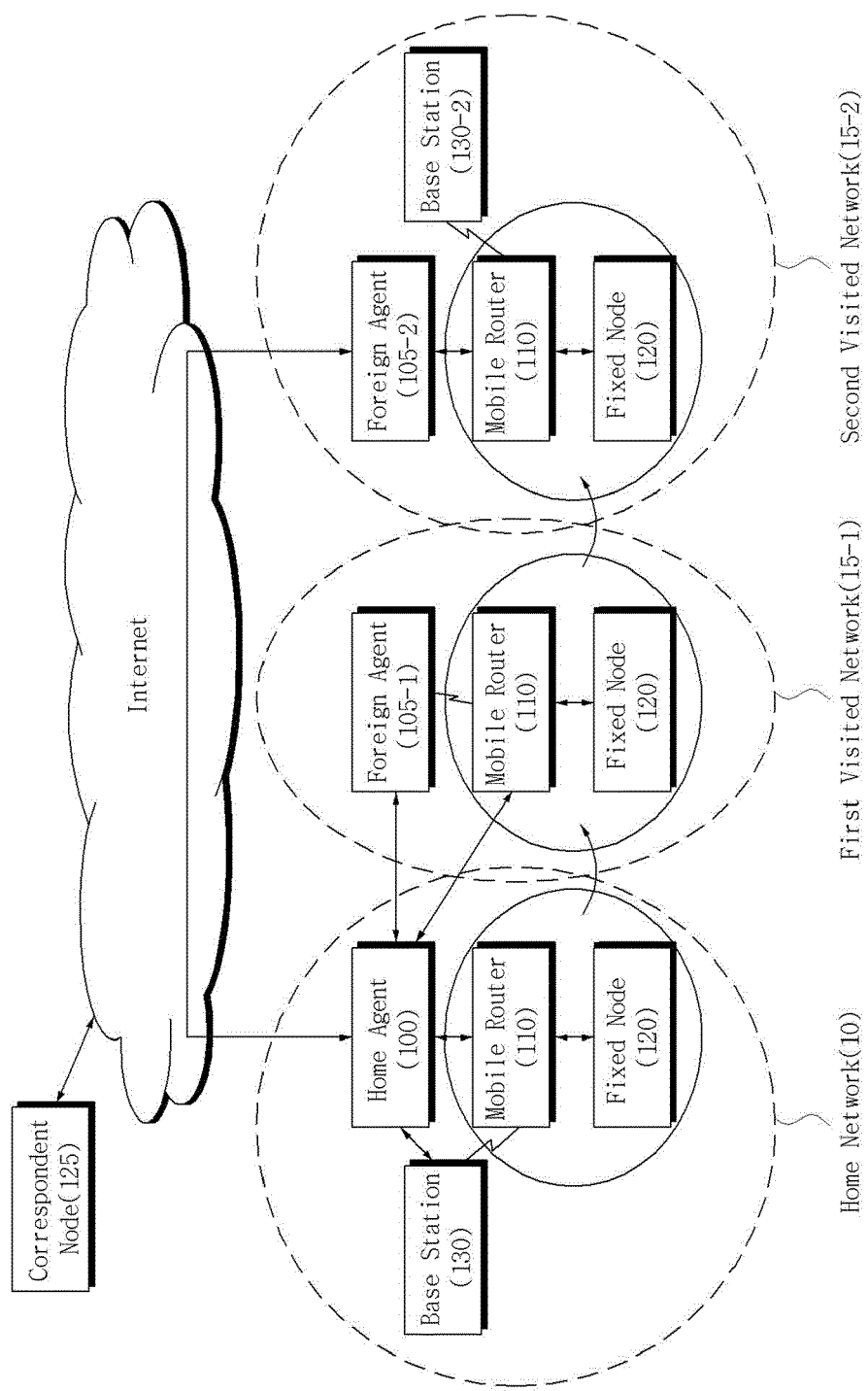
FIG. 1 illustrates a mobile network according to an exemplary embodiment.

FIG. 1 illustrates a mobile network according to an exemplary embodiment.

In this exemplary embodiment, it is assumed that a home network 10 and a second visited network 15-2 are wireless networks, and a first visited network 15-1 is a satellite network.

In this exemplary embodiment, the wireless networks are based on wireless local area network (LAN) or wireless broadband (WiBro). As shown in the home network 10 and the second visited network 15-2 of FIG. 1, the wireless networks include a home agent (HA) 100, a foreign agent (FA) 105-2, base stations (BSs) 130 and 130-2, a mobile router (MR) 110, and a fixed node (FN) 120 at the ends. The wireless networks provide high-speed Internet service to the MR 110 based on mobile network Internet protocol version 4 (IPv4) without changing an IP.

The satellite network can provide bidirectional Internet service based on second generation digital video broadcasting satellite (DVB-S2)/digital video broadcasting-return channel satellite (DVB-RCS), and includes an FA 105-1, the MR 110, and the FN 120 at the end, as shown in the first visited network 15-1 of FIG. 1. The FA 105-1 is located at a hub station of the satellite network, and bidirectionally linked with the MR 110 located at a mobile station in a high-speed train via a satellite serving as a visited-network-accessing router.

A correspondent node (CN) 125 is an FN that exchanges data with the MR 110 based on mobile network IPv4.

In this exemplary embodiment, when the MR 110 existing in the HA 10 moves to the first visited network 15-1 that is a satellite network, it is allocated a care-of address (CoA) that is a new IP address generated by the visited network 15-1 and establishes a new tunnel between the HA 100 and the FA 105-1. Thus, even if the MR 110 moves between networks, the FN 120 and the MR 110 can continue Internet service with the CN 125 without changing a home address (HoA) that is a unique fixed IP address of a terminal.

A fixed-node subscriber gets on a high-speed train at an origin station and accesses the Internet from a terrestrial network through the MR 110 and the BS 130. When the train departs from the station and the subscriber enters the IP domain, the FN 120 and the MR 110 in the train accesses an access router, that is, the FA 105-1. And, Internet service with the CN 125 can continue via a satellite link. When the train enters an intermediate station, that is, a shadow region in which service is not provided through the satellite link, a mobile network consisting of the MR 110 and the FN 120 at the end can continuously provide the service through a new visited network, that is, the second visited network 15-2 which is a wireless network.

At this time, the tunnel established between the FA 105-1 of the first visited network 15-1, which is a wireless network, and HA 100 of the home network 10 is released, and a CoA is allocated by the FA 105-2 of the second visited network 15-2 such that a new tunnel is established between the FA 105-2 of the second visited network 15-2 and the HA 100 of the home network 10. In other words, the FA 105-2 of the second visited network 15-2 can continuously provide the Internet service with the CN 125 without changing an HoA which is a fixed IP address. After this, when the train departs from the intermediate station which is a shadow region, and it is possible to access the first visited network 15-1 which is a satellite network, a new CoA is received from the first visited network 15-1. And, a tunnel is again established between the HA 100 and the FA 105-1 of the first visited network 15-1, and data transmission is performed. Finally, when the train arrives at the home network 10, the communication tunnel established through the satellite network is released, and the FN 120 can perform Internet communication with the CN 125 through a tunnel of the home network 10 between the MR 110 and the HA 100 using the HoA which is the original fixed IP address.

Figure 2:
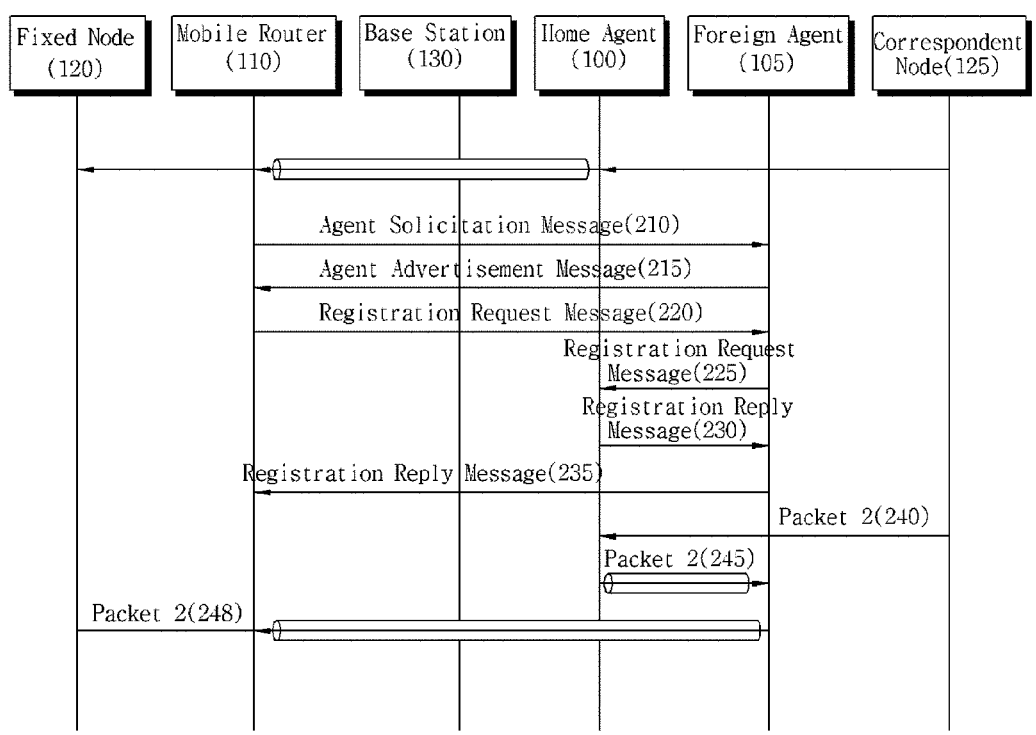
FIG. 2 is a signal flow diagram illustrating a method of performing handover in a mobile router according to an exemplary embodiment.

FIG. 2 is a signal flow diagram illustrating a method of performing handover in an MR according to an exemplary embodiment.

An MR 110 establishes a tunnel between a BS 130 and an HA 100 in a home network which is a wireless network, and an FN 120 receives packet 1 data from a CN 125 using an HoA which is a fixed home IP address of the FN 120 as a destination address (operation 200).

In an exemplary embodiment, when a train having the FN 120 and the MR 110 departs from a station, the MR 110 in the train is linked to an FA 105 with respect to a newly accessing satellite network. After this, an IP/mobile IP (MIP) layer is performed.

To rapidly perform handover, the MR 110 transmits an agent solicitation message, which is an MIP layer signal, to the FA 105 (operation 210).

The FA 105 receives the agent solicitation message from the MR 110, and then transmits an agent advertisement message containing CoA information, which is an IP address to be temporarily used by the MR 110 in a visited network, to the MR 110 (operation 215).

The MR 110 transmits a registration request message to the HA 100 via FA 105 (operation 220 and S225). And, the HA 100 transmits a registration reply message to the MR 110 in the reverse direction via the FA 105 (operations 230 and 235).

After the registration request and reply process, a new tunnel is established between the HA 100 and the FA 105, and packet 2 data can be transmitted between the CN 125 and the FA 105 through the tunnel (operations 240 and 245). And, the FN 120 can receive the packet 2 data from the FA 105 via the MR 110 (operation 248).

In other words, when the MR 110 is in the home network, a packet is transmitted from the CN 125 to the MR 110 and the FN 120 based on the HoA which is a fixed IP address via the HA 100 and the BS 130. After the MR 110 and the FN 120 move to a visited network which is a satellite network, a tunnel for the MR 110 is established using a CoA which is a new temporary IP address, and the packet transmitted by the CN 125 is routed through the tunnel. Thus, even if a domain is changed, it is unnecessary to change the HoA which is the home IP address of the FN 120 and the MR 110.

In an exemplary embodiment, when the train arrives at an intermediate station and moves to a new wireless network, the MR 110 is likewise linked to the FA 105 with respect to the new wireless network, and then a tunnel is established in the wireless network using a new CoA through the same MIP procedure. After this, packet data transmission is performed between the CN 125 and the FN 120.

Figure 3:
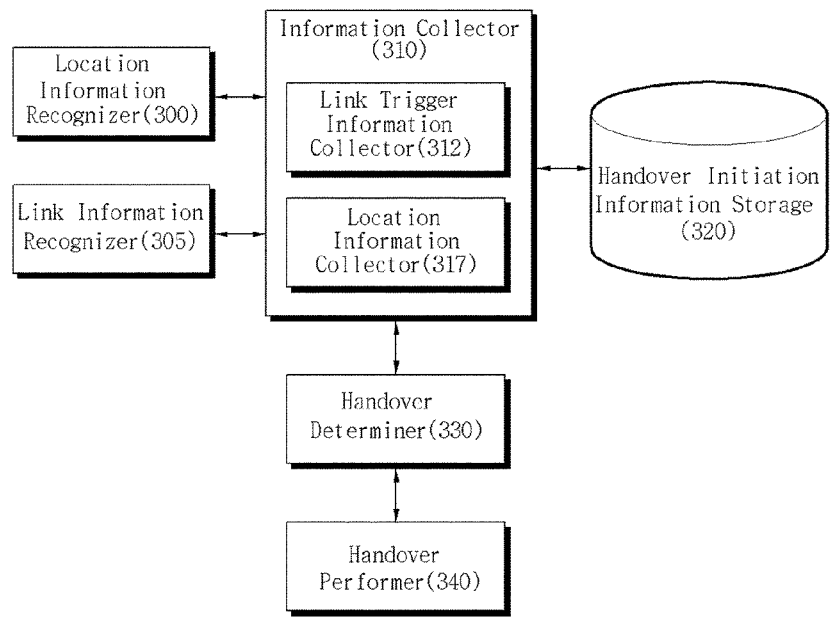
FIG. 3 is a block diagram of an apparatus for controlling handover according to an exemplary embodiment.

FIG. 3 is a block diagram of an apparatus for controlling handover according to an exemplary embodiment. As shown in FIG. 3, the apparatus for controlling handover includes a location information recognizer 300, a link information recognizer 305, a handover initiation information storage 320, a handover determiner 330, and a handover performer 340. The apparatus for controlling handover according to an exemplary embodiment includes an open interface, and thus is implemented to perform communication through a plurality of communication networks based on different methods. The apparatus for controlling handover according to an exemplary embodiment can be implemented in an MR managing a mobile network.

The location information recognizer 300 recognizes the current location of the apparatus for controlling handover. In this exemplary embodiment, the location information recognizer 300 may be implemented by a global positioning system (GPS) receiver. Here, the current location information may be GPS coordinate information.

The link information recognizer 305 recognizes trigger information of a link layer. In this exemplary embodiment, the link information recognizer 305 may recognize trigger information of the link layer about a plurality of communication networks based on different methods using the open interface. The handover initiation information storage 320 stores information about locations at which handover is performed in a database.

An information collector 310 matches information about a location corresponding to a point in time when handover is required with link trigger signal information obtained at the time, and stores the matched information in the handover initiation information storage 320. In this exemplary embodiment, the information collector 310 includes a link trigger information collector 312 which collects recognized link trigger information, and a location information collector 317 which collects location information recognized by the location information recognizer 300. According to movement of the apparatus for controlling handover, the information collector 310 matches location information about the apparatus with up/down link information of a link trigger signal about the respective networks based on different methods obtained at the location, and stores the matched information in the form of a table.

The handover determiner 330 determines whether handover to a network employing a different method is required or not based on information stored in the handover initiation information storage 320 according to current location information of the apparatus recognized by the location information recognizer 300.

At this time, the handover determiner 330 estimates a handover location based on the current location information about the apparatus in further consideration of at least one of a movement speed V and a handover processing time T. And, the handover determiner 330 estimates a handover location based on the current location information about the apparatus, and compares the estimated handover location with handover location information stored in the handover initiation information storage 320 to determine whether a handover to a network based on a different method is required or not at the current location.

In addition, the handover determiner 330 recognizes link trigger signal information according to the current location information, and recognizes information about a network to which handover will be performed. In an exemplary embodiment, when a link-up trigger signal of a second communication network based on a different method from an accessed first communication network is received, the handover determiner 330 determines to perform handover from the first communication network to the second communication network. The handover performer 340 performs handover according to the result of the determination of the handover determiner 330.

Figure 4:
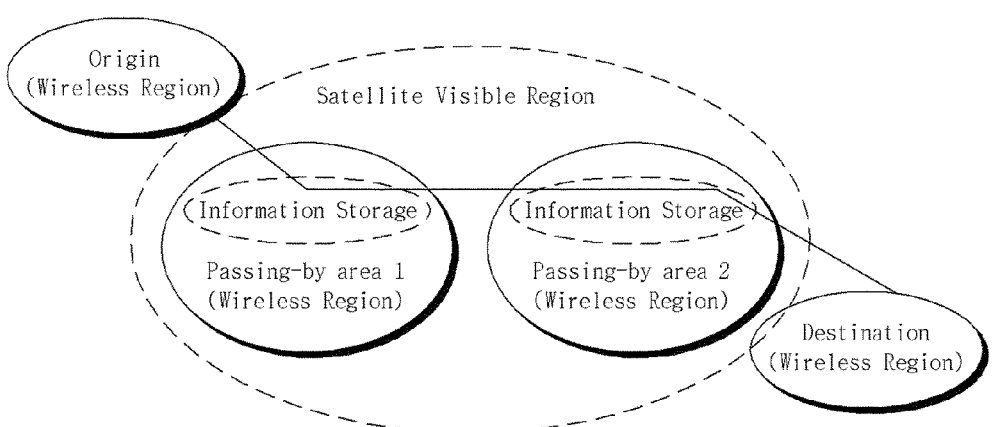
FIG. 4 is a diagram illustrating an integrated handover method according to an exemplary embodiment.

FIG. 4 is a diagram illustrating an integrated handover method according to an exemplary embodiment.

A handover operation process of an MR in a case in which a high-speed vehicle such as a high-speed train having the MR departs from an origin station and arrives at a destination station via several intermediate stations, will be described below with reference to FIG. 4.

The origin, destination and intermediate stations are satellite shadow regions, and have a terrestrial wireless region in which service is provided through a wireless network. Also, the stations have satellite/wireless overlap regions required for performing inter-network handover. In a satellite visible region away from the stations, Internet service can be provided through a satellite network.

At the beginning of the process in which the high-speed train departs from the origin and travels to the destination, handover is performed between a wireless network and the satellite network by a link-based trigger signal according to mobile network IPv4 procedure, as described above with reference to FIG. 2. At the same time, GPS location information corresponding to link-up and down trigger signals for the satellite network and a wireless network used for inter-network handover is collected. And, the link-up and down trigger signals and GPS location information are matched and stored in a handover initiation table.

When collection of GPS location information about all network regions from the origin of the high-speed train to the destination is completed, the MR sets up the handover initiation table for performing location-based handover. After this, handover is controlled such that Internet interworking service between the satellite network and a wireless network can be repeatedly performed over all regions based on the handover initiation table according to link information and a location-based trigger signal.

In this way, even if the high-speed train rapidly passes through a wireless region having small cells, MIP handover procedure is stably performed from the satellite network to a wireless network such that seamless network interworking service can be provided. Initial operation of the MR for collecting GPS information about network regions can be performed when the system is restarted at a network administrator's request, and can be actively applied to a change in network environment.

Figure 5:
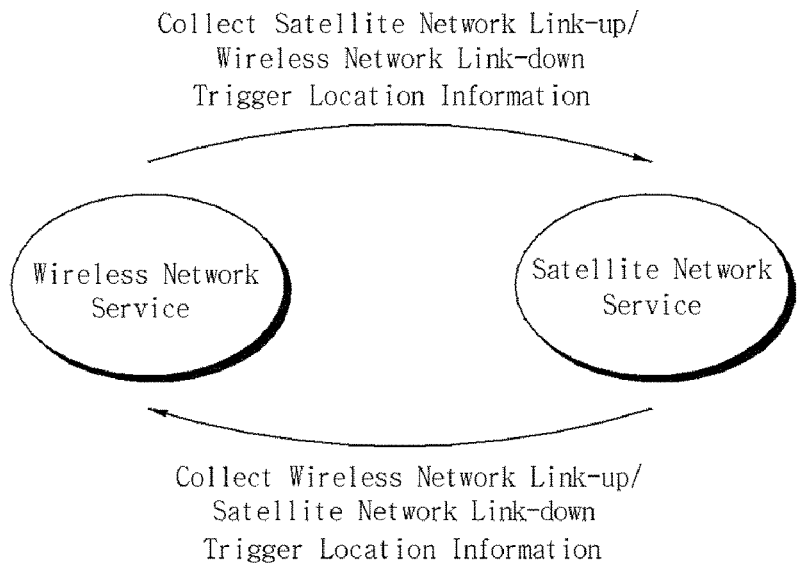
FIGS. 5 and 6 illustrate stage-specific state transition of a mobile router to which a method of performing handover according to an exemplary embodiment is applied.
Figure 6:
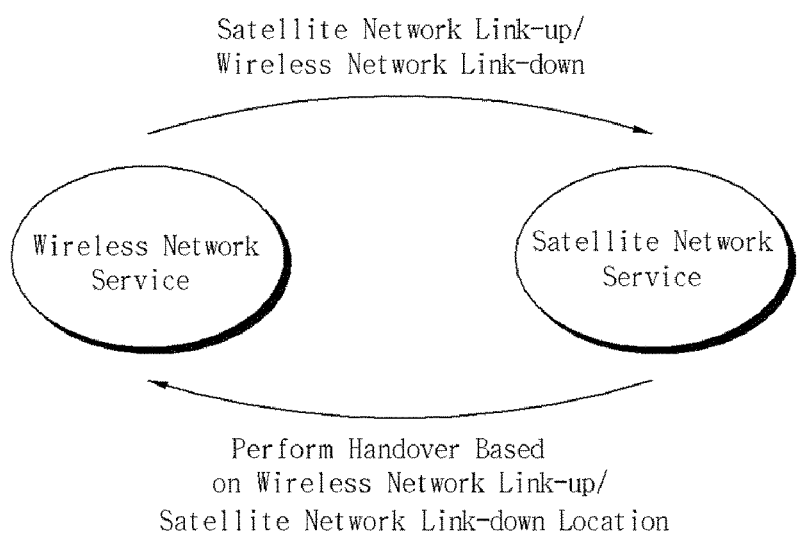

FIGS. 5 and 6 illustrate stage-specific state transition of an MR to which a method of performing handover according to an exemplary embodiment is applied.

Initial operation of an MR is a link-based handover procedure including a GPS information collection process. During the initial operation, service transition from a wireless network to a satellite network is performed by a satellite network link-up trigger signal and a wireless network link-down trigger signal. At this time, as can be seen from FIG. 5, the MR collects GPS coordinates corresponding to locations at which the satellite network link-up trigger signal and the wireless network link-down trigger signal are received.

On the other hand, service transition from the satellite network to the wireless network is initiated by a wireless network link-up trigger signal and a satellite network link-down trigger signal. The MR collects GPS location coordinates corresponding to locations at which the respective link-up/down trigger signals are received.

After this, as can be seen from FIG. 6, the MR performs handover based on the collected information according to location information and received link-up/down trigger signals. At this time, as mentioned above, transition from a wireless network to a satellite network is performed by a satellite network link-up trigger signal and a wireless network link-down trigger signal, and transition from the satellite network to the wireless network is performed by a wireless network link-up trigger signal and a satellite network link-down trigger signal. Also, handover may be performed to recognize previously collected GPS information based on the location information, and trigger signal information corresponding to the location such that interworking service is performed between the networks.

Figure 7:
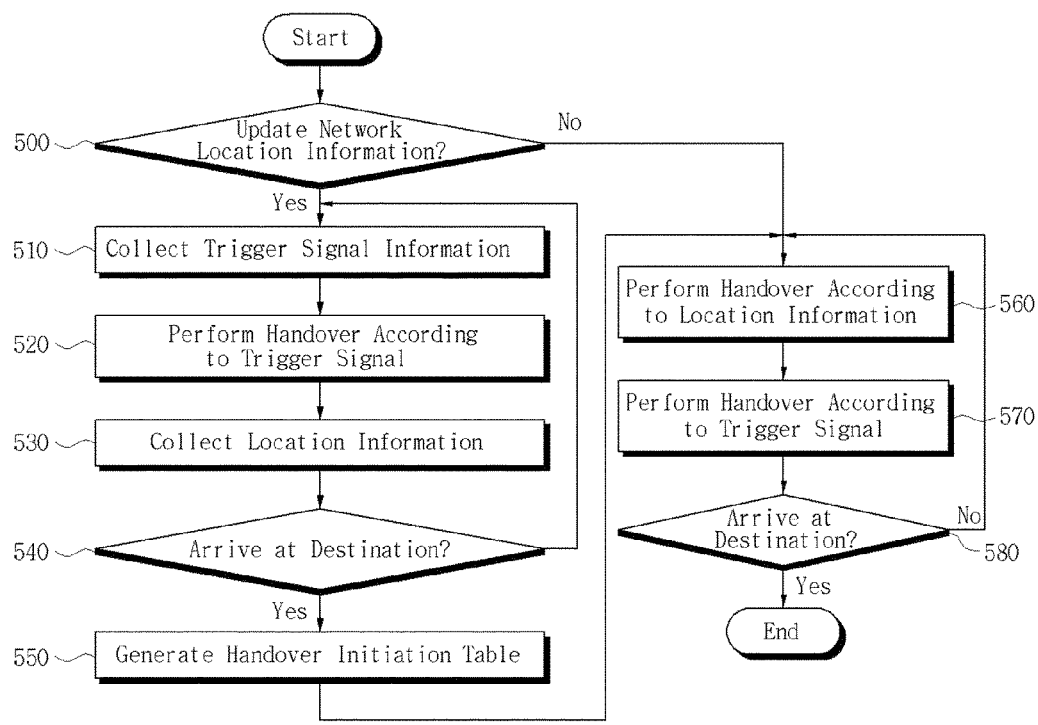
FIG. 7 is a flowchart illustrating a method of performing handover according to an exemplary embodiment.

FIG. 7 is a flowchart illustrating a method of performing handover according to an exemplary embodiment.

First, the method of performing handover according to an exemplary embodiment roughly includes collecting link-based trigger information and GPS information in order to provide Internet service interworking between satellite/wireless networks to which an exemplary embodiment is applied, and performing handover based on the information collected in collecting the link-based trigger information and GPS information according to location information and link information.

When a high-speed vehicle such as a high-speed train having an FN and an MR moves from an initial region, or network location information needs to be updated (operation 500), trigger signal information is collected during movement (operation 510). At this time, whether network location information needs to be updated or not may be determined by an administrator's instruction. And, handover is performed according to the collected trigger signal information (operation 520). At this time, inter-network transition operation is performed according to trigger signal information as described above. While handover is performed, location information is collected (operation 530). The location information may be GPS coordinate information. When the train arrives at its destination (operation 540), the collected trigger signal information and location information is matched and stored as a handover initiation table (operation 550).

Later, when the high-speed train moves through the region in which the collecting of the link-based trigger information and GPS information has been performed, a point in time to perform handover is determined with reference to the stored handover initiation table regarding the region.

More specifically, handover is performed according to trigger signal information (operation 570). At this time, an inter-network transition operation is performed according to the trigger signal information as described above. Before collecting trigger signal information, current location information may be monitored, and then trigger signal information corresponding to the location may be recognized with reference to the handover initiation table. Subsequently, handover is performed according to the result of the recognition (operation 560). Thus, handover can be rapidly performed, and heterogeneous networks interwork such that seamless Internet service can be provided.

Figure 8:
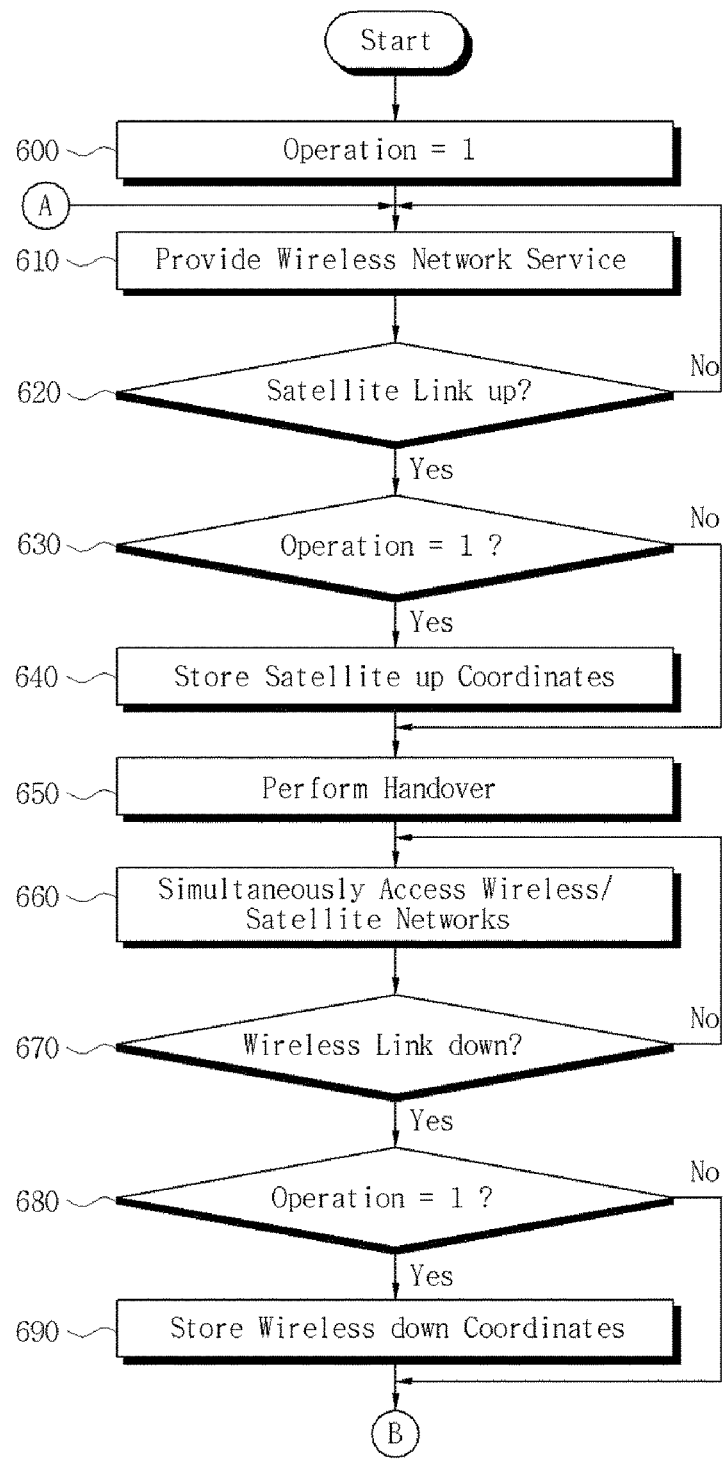
FIGS. 8 to 10 are flowcharts illustrating in detail a method of performing handover in a mobile router according to an exemplary embodiment.
Figure 9:
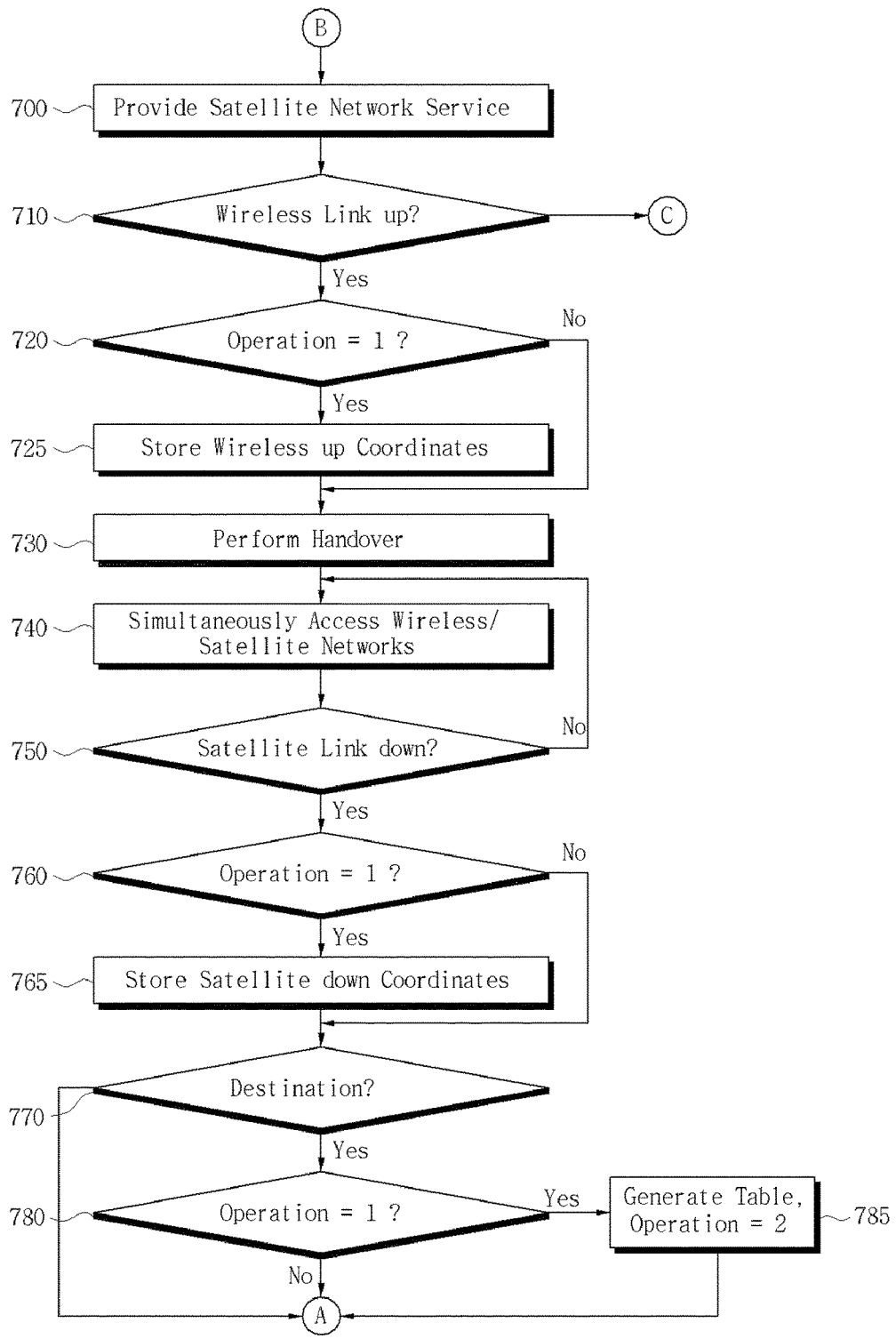
Figure 10:
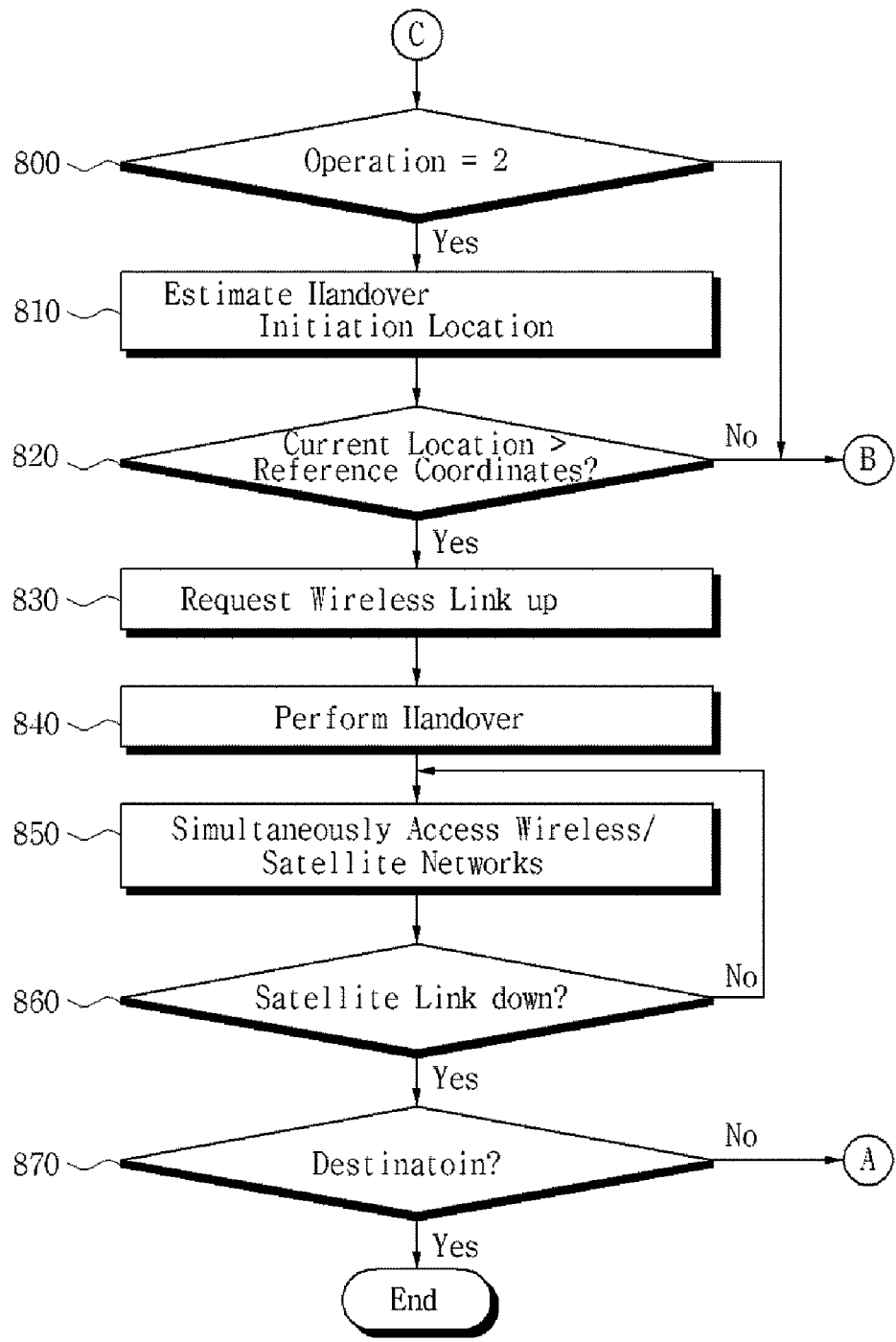

FIGS. 8 to 10 are flowcharts illustrating in detail a method of performing handover in an MR according to an exemplary embodiment.

First, when an MR having satellite and wireless network access interfaces needs to update GPS coordinate information about a network, it sets an operation to 1 (operation 600). Here, when a high-speed train, etc., having a mobile network moves to the corresponding region, or a change occurs in a communication network, an operation is configured to become 1 by the administrator. In this exemplary embodiment, when the MR is located in a home network which is a wireless network, it accesses a BS using the wireless network access interface, and performs IP communication with a CN via an HA (operation 610). And, the satellite network access interface continuously monitors whether a link-up trigger signal is generated or not.

When it is monitored that a satellite network link-up trigger signal is generated (operation 620), the MR checks whether the operation is 1 or not (operation 630). When the operation is 1, GPS coordinates corresponding to a location at which the satellite network link-up trigger signal is generated is stored in a handover initiation table (operation 640). And, handover procedure to a visited satellite network is performed through the satellite network access interface according to MIP registration procedure with an FA and the HA (operation 650). At this time, all packets transmitted from the wireless network access interface and the satellite network access interface are received (operation 660). Thus, even if the MR moves to a region in which the wireless network and the satellite network overlap each other, it is possible to prevent packet loss when data is transmitted between an FN and the CN.

When a wireless network link-down trigger signal is generated by the wireless network access interface (operation 670), it is checked whether the operation is 1 or not (operation 680). When the operation is 1, GPS coordinates corresponding to a location at which the wireless network link-down trigger signal is generated are stored in the handover initiation table (operation 690), and packet transmission together with the CN is continuously performed through the satellite network.

The MR provided with service through the satellite network (operation 700) continuously monitors whether a wireless network link-up trigger signal is generated or not (operation 710). According to whether the operation is 1 or not (operation 720), the MR recognizes and stores GPS coordinates corresponding to the wireless network link-up trigger signal in the handover initiation table (operation 725). The MR performs an MIP handover procedure to a wireless visited network together with a BS, the FA, and the HA through the wireless network access interface (operation 730), and thus can receive and process all packets transmitted by the wireless network access interface and the satellite network access interface without loss (operation 740).

Subsequently, when a satellite network link-down trigger signal is generated (operation 750), the MR checks whether the operation is 1 or not (operation 760). When the operation is 1, GPS coordinates corresponding to a location at which the satellite network link-down trigger signal is generated is stored in the handover initiation table (operation 765). Until the high-speed train arrives at the destination (operation 770), Internet service can be continuously provided by collecting GPS coordinate information about areas passed through and performing link-based handover between the satellite/wireless networks.

When the high-speed train arrives at the destination with the operation of the MR being 1 (operation 780), a handover initiation table is generated based on the collected GPS information, and the operation is set to 2 (operation 785). While the operation is set at 1, the MR monitors information about a location at which handover is performed between the wireless/satellite networks and link trigger state information at the point in time according to movement of the MR from the origin to the destination. At this time, whether or not to perform handover between the wireless/satellite networks may be determined only according to the link trigger state information.

After the operation is set to 2, inter-network handover is performed according to a link-based trigger signal as in operation 1. However, this case has a difference in the process of collecting GPS information about a location at which handover is performed.

In an exemplary embodiment, when the MR providing service through the satellite network is set to operation 2 (operation 800), the current location of the high-speed train is recognized, and a handover location is estimated in consideration of a movement speed V, a handover processing time T, etc., (operation 810). At this time, the current location may be GPS coordinate information. And, it is continuously monitored whether or not to perform handover at the estimated handover location based on the handover initiation table generated during operation 1 (operation 820).

When the train arrives at a location to perform handover, the MR requests a link to a visited network which is a wireless network (operation 830), performs handover (operation 840), and provides Internet service through the wireless network access interface (operation 850). Until a satellite link-down trigger signal is received (operation 860), the MR can simultaneously access the wireless/satellite networks and receive data.

As described above, when the MR enters a wireless area during movement in operation 2, it can perform handover using a location-based trigger signal. In other words, Internet service interworking between satellite/wireless networks is constantly provided even in a satellite shadow region, and the method of performing handover based on location information is repeated until the high-speed train arrives at the destination (operation 870).

FIG. 11 is a handover initiation table according to an exemplary embodiment.

Location information about an origin and destination of an MR is already-known values (a, b) and (c, d), which are stored in a Trigger Location column. Terrestrial wireless network service is enabled in these regions, and thus "Link UP" is shown in a Wireless Network Trigger column.

In this exemplary embodiment, when a high-speed train having the MR and an FN departs from the origin, it enters a visible region in which a satellite network can be accessed, and thus "Link UP" is shown in a Satellite Network Trigger column. GPS coordinates (x, y) corresponding to this point in time are stored in the Trigger Location column. When the train completely goes out of the origin station, access to the wireless network is terminated by link-down of a wireless network trigger, and "Link DOWN" is shown in the Wireless Network Trigger column. And, GPS coordinates corresponding to the location are stored in the Trigger Location column.

After this, the MR provides Internet service while moving through the satellite visible region. In an exemplary embodiment, when the train enters station 1 which is a transitory region, the MR performs handover from the satellite network to a wireless network based on a link trigger signal while passing through a satellite/wireless overlap region. More specifically, "Link UP" and "Link DOWN" are respectively shown in the Wireless Network Trigger column and the Satellite Network Trigger column, and the corresponding GPS coordinates are stored in the Trigger Location column.

When the high-speed train goes out of station 1, handover is performed from the wireless network to the satellite network, and the corresponding link trigger signal information and GPS coordinates are stored in the initiation table.

The above-described information collection process during passage through a station is performed over all regions until the train arrives at the destination. Therefore, it is possible to collect and store link trigger location information about satellite/wireless network service regions and link trigger signal information used to perform handover.

When collection of link information about satellite/wireless networks is completed over all regions from the origin to the destination, coordinates corresponding to a location at which satellite network link-down trigger signal is generated in each intermediate station are copied and stored in a Handover Reference Coordinates column. The stored handover reference coordinates may be used as a reference location to perform handover when the high-speed train moves through the corresponding region.

More specifically, first, information about a location at which a satellite visible region ends is stored. After this, when the high-speed train moves through the corresponding region, a location-based handover initiation trigger signal is generated with reference to the information. Thus, even if the train moves through a wireless region having small cells, network mobility detection time can be reduced. In other words, service interruption can be prevented.

The above-described method of performing handover can be implemented as a computer program that can be stored in computer-readable media, and read and executed by computer systems. The computer-readable media include magnetic recording media, optical recording media, etc.

As apparent from the above description, mobility detection time can be reduced by applying a handover technique between wireless/satellite networks based on link trigger and location to an MR moving at high speed. Thus, service interruption can be prevented regardless of movement speed, even in a satellite shadow region such as a station.

Also, satellite/wireless network link trigger coordinate information, which is a reference for initiating location-based handover, is neither fixed as initial values nor stored in a handover initiation table in advance. Rather, a handover table is actively generated and managed during movement through an area, and thus it is possible to actively and rapidly adapt to a change in the wireless environment of a network.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of performing handover between heterogeneous networks in a mobile router managing a mobile network, comprising:
   determining whether a handover to a network employing a different method from a network to which the mobile router belongs is required based on information prestored in the mobile router, the network to which the mobile router belongs determined by current location information of the mobile router; and
   performing the handover according to the result of the determination,
   the method further comprising, before the determining of whether the handover is required:
   monitoring link trigger signal information when the mobile router moves;
   determining whether the handover to the network employing the different method is required based on the link trigger signal information;
   performing the handover according to the result of the determination; and
   matching information about a location at which the handover is performed with the link trigger signal information and storing the result of the matching.

2. The method of claim 1, further comprising obtaining information about the network to which the handover will be performed from link trigger signal information corresponding to the current location information of the mobile router, based on the prestored information.

3. The method of claim 2, wherein the performing of the handover comprises, when a link-up trigger signal of the network employing the different method is received, performing the handover to the network employing the different method from the network to which the mobile router belongs.

4. The method of claim 3, wherein packet data is received through the network to which the mobile router belongs and the network employing the different method until a link-down trigger signal is received from the network to which the mobile router belongs.

5. The method of claim 1, wherein the determining of whether the handover is required comprises:
   recognizing the current location information of the mobile router; and
   comparing the current location information of the mobile router with handover location information included in the prestored information, and determining whether the handover to the network employing the different method is required at the current location of the mobile router.

6. The method of claim 1, wherein the determining of whether the handover is required comprises:
   recognizing the current location information of the mobile router;
   estimating a handover location based on the current location information of the mobile router; and
   comparing the estimated handover location with handover location information included in the prestored information, and determining whether the handover to the network employing the different method is required at the current location of the mobile router according to the result of the determination.

7. The method of claim 6, wherein the estimating of the handover location comprises estimating the handover location based on the current location information of the mobile router in consideration of at least one of a movement speed and a handover processing time.

8. The method of claim 1, wherein the location information is global positioning system (GPS) coordinate information.

9. The method of claim 1, wherein the matching and storing of the location information comprises when the mobile router moves, matching location information of the mobile router with up/down information of link trigger signals for networks employing different methods at the current location of the mobile router, and storing the results of the matching in the form of a table.

10. An apparatus for controlling handover between heterogeneous networks, comprising:
- a location information recognizer recognizing current location information of a mobile router managing a mobile network;
- a handover initiation information storage storing handover location information;
- a handover determiner determining whether a handover to a network employing a different method from a network accessed by the mobile router is required according to the current location information of the mobile router recognized by the location information recognizer, based on information prestored in the handover initiation information storage;
- a handover performer performing the handover according to the result of the determination; and
- an information collector matching link trigger signal information with the current location information of the mobile router when the handover determiner determines that the handover is required, and storing the result of the matching in the handover initiation information storage,
- wherein the information collector comprises:
- a link trigger information collector collecting the link trigger signal information; and
- a location information collector collecting the location information recognized by the location information recognizer.

11. The apparatus of claim 10, wherein when the apparatus moves, the information collector matches location information of the apparatus with up/down link information of link trigger signals for networks employing different methods at the current location of the apparatus, and stores the results of the matching in the form of a table.

12. The apparatus of claim 10, wherein the handover determiner estimates a handover location based on the current location information of the mobile router, compares the estimated handover location with the handover location information stored in the handover initiation information storage, and determines whether the handover to the network employing the different method is required at the current location of the mobile router.

13. The apparatus of claim 12, wherein the handover determiner estimates the handover location based on current location information of the apparatus in consideration of at least one of a movement speed and a handover processing time.

14. The apparatus of claim 10, wherein the handover determiner recognizes link trigger signal information according to the current location information of the apparatus, and recognizes information about the network to which the handover will be performed according to the link trigger signal information.

15. The apparatus of claim 14, wherein when a link-up trigger signal of the network employing the different method is received, the handover determiner performs the handover from the network accessed by the mobile router to the network employing the different method.

16. A mobile router comprising an apparatus for controlling handover between heterogeneous networks, wherein the apparatus comprises:
- a location information recognizer recognizing current location information of the mobile router;
- a handover initiation information storage storing handover location information;
- a handover determiner determining whether a handover to a network employing a different method is required according to the current location information recognized by the location information recognizer, based on information stored in the handover initiation information storage;
- a handover performer performing the handover according to the result of the determination; and
- an information collector matching link trigger signal information with the current location information of the mobile router when the handover determiner determines that the handover is required, and storing the result of the matching in the handover initiation information storage,
- wherein the information collector comprises:
- a link trigger information collector collecting the link trigger signal information; and
- a location information collector collecting the location information recognized by the location information recognizer.

* * * * *